United States Patent
Sano et al.

(10) Patent No.: US 6,920,037 B2
(45) Date of Patent: Jul. 19, 2005

(54) SOLID ELECTROLYTIC CAPACITOR

(75) Inventors: Mitsunori Sano, Sendai (JP); Takashi Kono, Sendai (JP); Kazuto Yoshida, Kitakami (JP); Takashige Suzuki, Kitakami (JP)

(73) Assignee: NEC TOKIN Corporation, Sendai (JP)

( * ) Notice: Subject to any disclaimer, the term of this patent is extended or adjusted under 35 U.S.C. 154(b) by 16 days.

(21) Appl. No.: 10/623,255

(22) Filed: Jul. 18, 2003

(65) Prior Publication Data

US 2004/0052033 A1 Mar. 18, 2004

(30) Foreign Application Priority Data

Jul. 22, 2002 (JP) ......................... 2002-212492

(51) Int. Cl.[7] .......................... H01G 4/228; H01G 9/04; H01G 9/00
(52) U.S. Cl. .................. 361/540; 361/528; 29/25.03
(58) Field of Search .................. 361/523, 528–529, 361/531, 532–535; 29/25.03

(56) References Cited

U.S. PATENT DOCUMENTS 4,017,773 A * 4/1977 Cheseldine ................. 361/532
4,660,127 A * 4/1987 Gunter ....................... 361/540
6,392,869 B2 * 5/2002 Shiraishi et al. ............ 361/523
6,625,009 B2 * 9/2003 Maeda ....................... 361/528

FOREIGN PATENT DOCUMENTS

| JP | 2001-110676 | 4/2001 |
|----|-------------|--------|
| JP | 2001-267180 | 9/2001 |

OTHER PUBLICATIONS

Article entitled Development of Small Undersurface Electrode Tantalum Chip Capacitors, by Mitsunori Sano et al, NEC Technical Journal, vol. 54, No. 11/2001, pp. 53–56.

* cited by examiner

Primary Examiner—Eric Thomas
(74) Attorney, Agent, or Firm—Frishauf, Holtz, Goodman & Chick, P.C.

(57) ABSTRACT

In a solid electrolytic capacitor, an anode terminal (27 in FIG. 3) has a T-shaped section in which two plate pieces intersect at right angles. One of the two plate pieces is exposed to the mounting surface of the solid electrolytic capacitor, while the other is perpendicularly erected to an anode lead (11). The two plate pieces are made of a series of continuous members.

16 Claims, 3 Drawing Sheets

SOLID ELECTROLYTIC CAPACITOR

The present application claims priority to prior Japanese application JP 2002-212492, the disclosure of which is incorporated herein by reference.

BACKGROUND OF THE INVENTION

The present invention relates to the structure of a solid electrolytic capacitor, and more particularly to the shapes and forming methods of electrode terminals.

With the miniaturization of electronic equipment, the surface mount of solid electrolytic capacitors has been necessitated, and surface-mountable solid electrolytic capacitors of chip type have been often employed.

A solid electrolytic capacitor in the prior art (hereinbelow, called "related art 1") includes a capacitor element, an anode terminal which is joined to the anode lead of the capacitor element, and a cathode terminal which is disposed at the outer periphery of the capacitor element through an electroconductive adhesive. The solid capacitor has its surroundings covered with a casing material, such as plastics material. Herein, the cathode terminal and the anode terminal are formed so as to be exposed along the surface of the casing material.

Besides, as electronic equipment have become smaller in size and higher in performance in recent years, still smaller sizes and still larger capacitances have been required of capacitors. In this regard, products of bottom electrode structure type have been developed, in each of which electrode terminals are fixed on the mounting surface of the product, whereby the internal structure of the capacitor is made efficient so as to enlarge the volume of a capacitor element more (refer to, for example, JP-A-2001-267180 and JP-A-2001-110676 which shall be respectively referred to as "related arts 2 and 3" below).

In the solid electrolytic capacitor of bottom electrode structure type, a cathode terminal and an anode terminal are provided only at the mounting surface of the product. A capacitor element is bonded with the cathode terminal by an electroconductive adhesive. An anode lead is connected to the anode terminal through an anode connection component. Welding, the electroconductive adhesive, or the like is employed for anode connection component and anode terminal connecting the adjacent ones of the anode connection line or lead.

The structure of the solid electrolytic capacitor of conventional surface mount type, however, has had the problem that large spaces are required for joining the capacitor element with the anode terminal and the cathode terminal, so the volume of the capacitor element cannot be made very large.

The reason therefor is that, since the anode terminal and the anode lead are joined in parallel, the space for leading out the anode terminal from the joined part of the anode to the exterior of the casing material is required. Also in the connection between the cathode terminal and the element, the space for leading out the cathode terminal from the joined part thereof to the exterior of the casing material is required. Since the spaces for leading out the anode terminal and the cathode terminal do not contribute to the capacitance of the capacitor, they have been minus factors for reducing the size of the capacitor and enlarging the capacitance thereof.

On the other hand, the recent solid electrolytic capacitor of bottom electrode structure type has had the problem that the reliability of electrical connections lowers. The reason therefor is that the anode connection component is used for relaying the connection between the anode lead and the anode terminal, so two places to be joined are provided. In the conventional surface mount type, anode connection is made in only one place between the anode lead and the anode terminal, so that the bottom electrode structure type is lower in the connection reliability.

Further, even the solid electrolytic capacitor of bottom electrode structure type requires the wet bumps, which will be referred to as "fillets", hereinbelow, of a solder at terminal parts on the side surfaces of the product after being mounted on a substrate. In each of the solid electrolytic capacitor of the conventional surface mount type and that of the prior-art bottom electrode type, accordingly, the terminals are so arranged that, in order to form the fillets, parts of the terminals are exposed to the side surfaces of the product in the directions of the anode and the cathode so as to hold the wettability of the solder. That is, a terminal array in which the fillets are formed needs to be realized in the solid electrolytic capacitor.

SUMMARY OF THE INVENTION

It is an object of the present invention to provide a solid electrolytic capacitor of chip type which can attain a smaller size and a larger capacitance without lowering a connection reliability.

It is another object of the present invention to provide a solid electrolytic capacitor of chip type which has a terminal array adapted to form fillets.

According to the present invention, in the bottom electrode structure type wherein the volume of a capacitor element can be set large, an anode terminal is brought into the shape of letter T, and the T-shaped terminal is formed by subjecting a single metal plate to bending and brushing works.

More specifically, according to the first aspect of the present invention, there is provided a solid electrolytic capacitor which includes a capacitor element, an anode terminal, a cathode terminal, and a casing material. The capacitor element contains a porous sintered compact made of a valve action metal and having an anode lead, and a dielectric, an electrolyte and a cathode layer successively formed on a surface of the porous sintered compact. The anode terminal is connected to the anode lead of the capacitor element. The cathode terminal is connected to the cathode layer. The casing material covers the terminals and the capacitor element.

In the solid electrolytic capacitor, the anode terminal includes a first plate piece, a second plate piece and a third plate piece. The first plate piece has first and second ends. The second plate piece has third and fourth ends. The third plate piece has fifth and sixth ends. The third plate piece holds the fifth and sixth ends in communication. The third plate piece has one surface exposed to the exterior of the casing material and forming a mounting surface. The other surface opposes the exposed surface. The first plate piece has the first end arranged in proximity to or in butt on said other surface so as to intersect in the shape of letter T with said third plate piece. The second end of said first plate piece is extended and joined to the anode lead. The second end and the fourth end are respectively connected to the third end and the fifth end. The first, second and third plate pieces are formed of continuous members.

Besides, according to the second aspect of the present invention, there is provided a solid electrolytic capacitor which comprises a capacitor element which has an anode lead exposed to the exterior of one end thereof, and in which a dielectric, an electrolyte and a cathode layer are successively formed on a surface of a porous sintered compact made of a valve action metal. The solid electrolytic capacitor further comprises an anode terminal connected to the anode lead of the capacitor element, a cathode terminal connected to the cathode layer, and a casing material covering the terminals and the capacitor element. In the solid electrolytic capacitor, the anode terminal includes a first plate piece a second plate piece, and a third plate piece. The first plate piece has a joint with the anode lead as its one end surface, and extends from the joint toward a mounting surface in a perpendicular direction. The second plate piece is bent at about 90 degrees at the mounting surface so as to extend toward a cathode. The third plate piece is formed in such a way that a side of said mounting surface is folded back toward an anode by bending at about 180 degrees. The third plate piece extends to an end surface of the casing material toward the anode, and is perpendicularly cut at the end surface of said casing material so as to define a cut section that forms another end surface of said anode terminal. The second and third plate pieces are pressure-welded to each other so as to become integral.

Besides, according to the third aspect of the present invention, there is provided a method of manufacturing a solid electrolytic capacitor which includes a capacitor element, an anode terminal, a cathode terminal, and a casing material. The capacitor element contains a porous sintered compact and a dielectric, an electrolyte and a cathode layer. The porous sintered compact is made of a valve action metal and has an anode lead. The dielectric, the electrolyte, and the cathode layers are successively formed on a surface of the porous sintered. The anode terminal is connected to the anode lead of the capacitor element. The cathode terminal is connected to the cathode layer. The casing material covers the terminals and the capacitor element. The method includes the steps of: preparing as the anode terminal a series of members in which a first plate piece is continuous to a third plate piece through a second plate piece; forming the series of members into a shape in which the first and third plate pieces intersect in a shape of letter T in a state where the first plate piece extends to said anode lead; and forming the second and third plate pieces into a state where one surface of the third plate piece is exposed to the exterior of the casing material as a mounting surface of the solid electrolytic capacitor.

Further, according to the fourth aspect of the present invention, there is provided a method of manufacturing a solid electrolytic capacitor. The solid electrolytic capacitor includes a capacitor element, an anode terminal, a cathode terminal, and a casing material. The capacitor element contains a porous sintered compact made of a valve action metal having an anode lead exposed to the exterior of one end thereof, and a dielectric, an electrolyte and a cathode layer successively formed on a surface of the porous sintered compact. The anode terminal is connected to the anode lead of said capacitor element. The cathode terminal is connected to the cathode layer. The casing material covers the terminals and the capacitor element. The method includes the steps of forming as the anode terminal a first plate piece which has a joint with the anode lead as its one end surface, and which extends from the joint toward a mounting surface in a perpendicular direction, a second plate piece which is bent at about 90 degrees at the mounting surface so as to extend toward a cathode, and a third plate piece which is formed in such a way that a side of said mounting surface is folded back toward an anode by bending at about 180 degrees. The third plate piece is extended to an end surface of the casing material toward the anode, and is perpendicularly cut at the end surface of the casing material so as to define a cut section that forms another end surface of the anode terminal, and pressure-welding the second and third plate pieces to each other so as to become integral.

DESCRIPTION OF THE PREFERRED EMBODIMENTS

Before the description of the preferred embodiments of the present invention, a solid electrolytic capacitor in the prior art will be explained with reference to the drawings in order to facilitate understanding of the invention.

Figure 1:
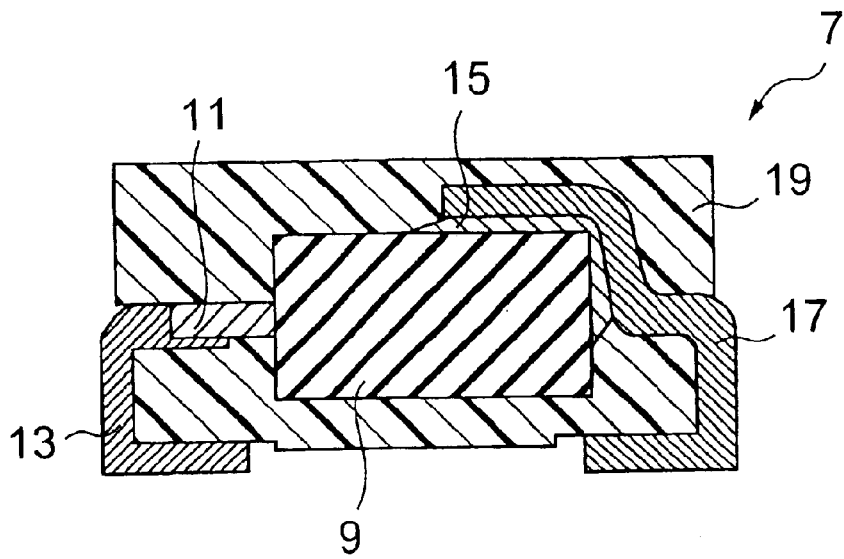
FIG. 1 is a sectional view showing a prior-art example of a solid electrolytic capacitor of surface mount type.

Referring to FIG. 1, a solid electrolytic capacitor 7 based on the related art 1 includes a capacitor element 9, an anode terminal 13 which is joined to the anode lead 11 of the capacitor element 9, and a cathode terminal 17 which is disposed at the outer periphery of the capacitor element 9 through an electroconductive adhesive 15. The solid electrolytic capacitor 7 is formed in a state where its surroundings are covered with a casing material 19 such as plastics material. The cathode terminal 17 and the anode terminal 13 are formed so as to be exposed along the surface of the casing material 19.

The capacitor element 9 is manufactured as stated below. By way of example, Ta powder is pressed around a Ta wire material, in which Ta is one of the valve action metals. The resulting material is sintered in vacuum so as to form an anode body. The anode body is subjected to anode oxidation, thereby to form a Ta oxide. Subsequently, the resulting anode body is dipped into an electrolytic solution, for example, an aqueous solution of manganese nitrate and is thermally decomposed so as to form a manganese dioxide layer. Subsequently, the resulting anode body is dipped into and covered with graphite, and the periphery thereof is coated with a silver paste. Thus, the lead of the Ta wire material is used as an anode, and the side of the silver paste is used as a cathode portion.

Figure 2:
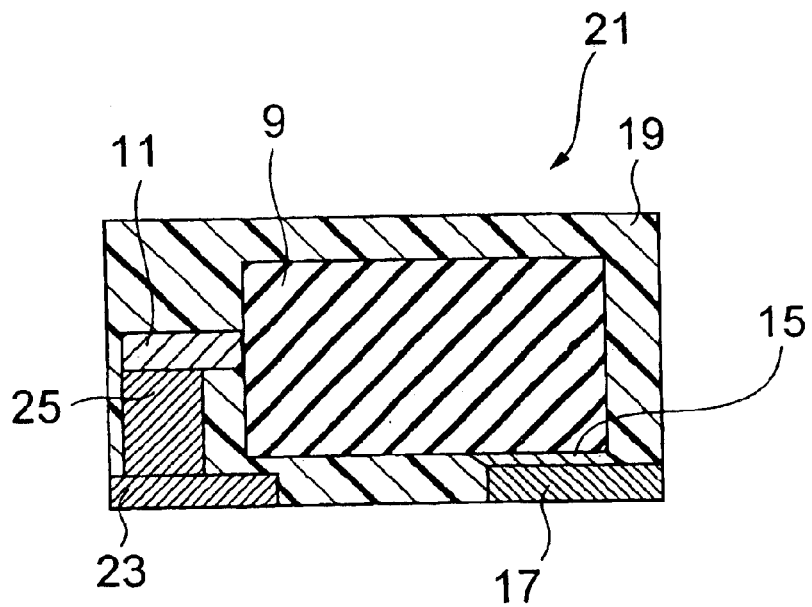
FIG. 2 is a sectional view showing another prior-art example of a solid electrolytic capacitor of surface mount type, that is, showing a solid electrolytic capacitor of bottom electrode structure type.

Referring to FIG. 2, a solid electrolytic capacitor of surface mount type based on the related art 2 or 3 is called "solid electrolytic capacitor of bottom electrode structure type". In the solid electrolytic capacitor 21 of bottom electrode structure type, a cathode terminal 17 and an anode terminal 23 are provided only at the mounting surface of the product. A capacitor element 9 is bonded with the cathode terminal 17 by an electroconductive adhesive 15. An anode lead 11 is connected with the anode terminal 23 through an anode connection component 25. Means, such as welding or the electroconductive adhesive 15, is employed for connecting the adjacent ones of the anode connection line or lead 11, anode connection component 25 and anode terminal 23. Numeral 19 designates a casing material.

Now, the embodiments of the present invention will be described in detail with reference to the drawings.

First Embodiment

Figure 3:
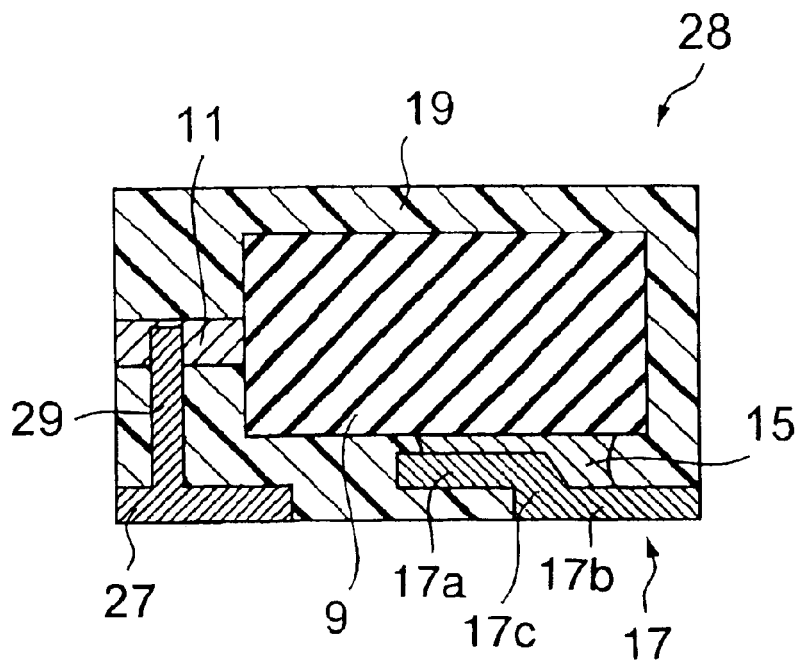
FIG. 3 is a sectional view showing a solid electrolytic capacitor according to the first embodiment of the present invention.

Referring to FIG. 3, in a solid electrolytic capacitor 28 according to the first embodiment of the present invention, a capacitor element 9 is connected to a cathode terminal 17 through an electroconductive adhesive 15. Besides, an anode lead 11 led out from the capacitor element 9 is connected to the end (first end) of a bent-up anode portion 29 which is the first plate piece of an anode terminal 27, by a process such as welding. Use is made as the capacitor element 9 of one having a construction similar to that of the related arts 2 and 3.

The cathode terminal 17 includes a cathode connection portion 17a being a fourth plate piece and a bottom electrode portion 17b being a fifth plate piece as form a step through an interconnection portion 17c therebetween and as are formed in parallel to each other. The upper surface of the cathode connection portion 17a is connected to a cathode portion at the outer periphery of the capacitor element 9 by the electroconductive adhesive 15. On the other hand, the lower surface of the bottom electrode portion 17b is exposed to exterior of a casing material 19 so as to form a mounting surface.

Figure 4:
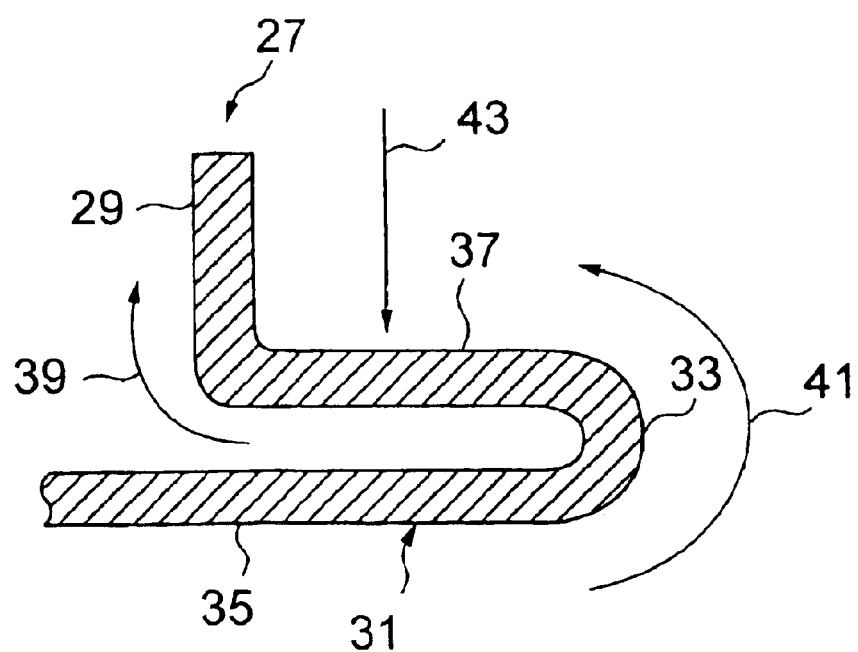
FIG. 4 is a sectional view showing a method of forming an anode terminal for use in the solid electrolytic capacitor in FIG. 3.

As best shown in FIG. 4, the anode terminal 27 is in the shape of letter T in which the bent-up anode portion 29, and a so-called bottom electrode portion 31 being a third plate piece as is continuous to the bent-up anode portion 29 through a communication part 37 being a second plate piece and as extends along a mounting surface, are formed so as to intersect at right angles. Here, the upper and lower ends of the bent-up anode portion 29 will be respectively referred to as the "first and second ends", the left and right ends of the communication part 37 the "third and fourth ends", and the right and left ends of the bottom electrode portion 31 as the "fifth and sixth ends".

The bottom electrode portion 31 includes a mounting surface side part 35 which forms a flat surface that is bent through a bent part 33 is the boundary part between the fifth and fourth ends, so as to define 180 degrees, and the communication part 37 which is disposed in opposition to the mounting surface side part 35. The third end is the distal end of the communication part 37 and communicates with the second end of the bent-up anode portion 29 which is perpendicularly bent and erected. Besides, the T-shaped anode terminal 27 is fabricated from a single metal plate by punching based on a press work, and a bending work, and it has no connection part even at an intersection point in the letter T.

Referring to FIG. 4 again, in order to form the anode terminal 27 for use in the solid electrolytic capacitor, the single metal plate is bent at about 90 degrees by the press molding as indicated at an arrow 39. The bent-up anode portion 29 is formed by the bending. Subsequently, the resulting metal plate is bent at about 180 degrees as indicated at an arrow 41. The terminal part of the mounting surface is formed by the bending. Lastly, both the bent parts are subjected to a crushing work as indicated at an arrow 43. Thus, the two plate parts placed one over the other by the 180-degree bending are thinned to be about 1–1.3 times as thick as the original plate. Owing to the crushing work, the anode terminal 27 is prevented from coming into touch with the cathode 15 at the outer periphery of the capacitor element 9.

The above fabrication of the anode terminal 27 is entirely performed by a series of press works. The press works for the fabrication has the advantages that the dimensional accuracies of the works are high, so microfabrication is possible, and that, since the press works afford a high productivity and are suited to mass production, a production cost can be curtailed.

In the first embodiment of the present invention, the anode terminal 27 is brought into the shape of letter T, and the anode connection component having been required in the bottom electrode terminal type in the prior art becomes unnecessary. Therefore, only one connection place suffices, and a connection reliability does not lower. Accordingly, the solid electrolytic capacitor of the bottom electrode type can be realized as the high quality of the solid electrolytic capacitor of the conventional surface mount type is kept, so that a capacitor of small size and large capacitance can be realized. Moreover, terminal surfaces can be arranged at the side surfaces of anode and cathode ends so as to develop fillets in the operation of mounting the capacitor on a substrate.

Second Embodiment

Figure 5:
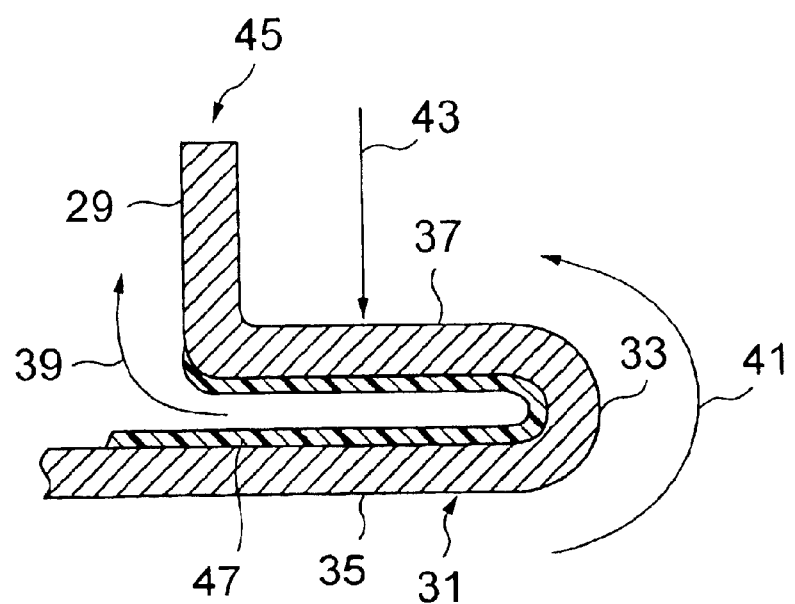
FIG. 5 is a sectional view showing a method of forming an anode terminal for use in a solid electrolytic capacitor according to the second embodiment of the present invention.

Referring to FIG. 5, a solid electrolytic capacitor according to the second embodiment has the same construction as that of the first embodiment except an anode terminal portion. In an anode terminal 45 according to the second embodiment of the present invention, part of a terminal surface, that is, the opposing surfaces of the mounting surface side part 35 and the communication part 37 is/are coated with a resin film 47 before the press works of this anode terminal. The resin film 47 is applied on those surfaces of the two parts 35 and 37 which are pressure-welded to each other by the crushing work, and it can enhance the sealability and joining strength of the joined surfaces. A resin to be selected for the resin film 47 may be one which is soft and ductile, which is set by heating or the like and which exhibits a high bondability. Such resins are, for example, an epoxy resin, a silicone resin and an acrylic resin, but they are not restrictive.

As described above, according to the solid electrolytic capacitor of the present invention, an anode terminal which is in the shape of letter T and which is molded from a single metal plate is employed, and anode connection is completed in one place for the connection between an anode lead and the bent-up anode portion of the anode terminal, so that a bottom electrode structure advantageous for a smaller size and a larger capacitance can be adopted without incurring the lowering of a connection reliability.

Moreover, according to the solid electrolytic capacitor of the present invention, the anode terminal is formed by press works capable of microfabrication and mass production, so that the dimensional accuracy of the anode terminal is superior, and the anode terminal can be mass-produced stably at a low cost. Accordingly, the capacitor can curtail a mass-production cost and has a stable quality in mass production.

The present invention has been described with respect to particular illustrative embodiments. It is to be understood that the present invention is not limited to the above described embodiments and that various changes and modifications may be made by those of ordinary skill in the art without departing from the spirit and scope of the invention.

What is claimed is:

1. A solid electrolytic capacitor comprising:
   a capacitor element including a porous sintered compact made of a valve action metal and having an anode lead, and wherein a dielectric, an electrolyte layer and a cathode layer are successively formed on a surface of the porous sintered compact;
   an anode terminal connected to the anode lead of said capacitor element;
   a cathode terminal connected to the cathode layer; and
   a casing material covering said terminals and said capacitor element;
   wherein:
   said anode terminal includes a first plate piece having first and second ends, a second plate piece having third and fourth ends, and a third plate piece having fifth and sixth ends,
   said first, second and third plate pieces are formed of continuous members,
   said first and said second plate pieces are placed at an interior of said casing material,
   said second and said third plate pieces are folded onto each other so as to be formed integrally,
   said third plate piece includes (i) a first surface exposed to an exterior of said casing material which forms a mounting surface defined by said the fifth and sixth ends and (ii) a second surface opposing the exposed surface,
   said first end of said first plate piece is arranged one of adjacent to and abutting said second surface so as to intersect to form a T shape,
   said second end of said first plate piece is extended and joined to the anode lead, and
   said first end and the fourth end are respectively connected to the third end and the fifth end.

2. The solid electrolytic capacitor as defined in claim 1, wherein said second plate piece is arranged nearer to said cathode layer than said third plate piece.

3. The solid electrolytic capacitor as defined in claim 1, wherein said first plate, said second plate and said third plate of said anode terminal are formed of a single metal plate.

4. The solid electrolytic capacitor as defined in claim 1, wherein said cathode terminal includes a fourth plate piece and a fifth plate piece each having an inner end connected to an interconnection portion so as to form a step through the interconnection portion, such that the fourth plate piece and the fifth plate piece are parallel to each other,
   wherein one surface of said fourth plate piece is joined to said cathode layer, and a surface of said fifth plate piece which is farthest from said cathode layer forms a mounting surface exposed to the exterior of said casing material.

5. The solid electrolytic capacitor as defined in claim 4, wherein said fifth plate piece extends away from said anode terminal with respect to said fourth plate.

6. The solid electrolytic capacitor as defined in claim 1, wherein a resin film is formed on said second and third plate pieces, and said second and third plate pieces are joined to each other through the resin film by pressure-welding.

7. A solid electrolytic capacitor comprising:
   a capacitor element including a porous sintered compact made of a valve action metal and having an anode lead exposed to an exterior of one end thereof, and wherein a dielectric, an electrolyte layer and a cathode layer are successively formed on a surface of the porous sintered compact;
   an anode terminal connected to the anode lead of said capacitor element;
   a cathode terminal connected to the cathode layer; and a casing material covering said terminals and said capacitor element,
   wherein said anode terminal includes:
      a first plate piece having a joint with said anode lead as a first end surface of the anode terminal and extending from the joint toward a mounting surface in a perpendicular direction with respect to the mounting surface;
      a second plate piece bent at substantially 90 degrees at the mounting surface so as to extend toward a cathode of the capacitor; and
      a third plate piece formed such that a side of said mounting surface is folded back toward an anode of the capacitor by bending at substantially 180 degrees;
      wherein said third plate piece extends to an end surface of said casing material toward the anode of the capacitor and is perpendicularly cut at an end surface of said casing material so as to define a cut section that forms a second end surface of said anode terminal; and
      wherein the second and third plate pieces are pressure-welded to each other so as to become integral.

8. The solid electrolytic capacitor as defined in claim 7, wherein a resin film is formed on said second and third plate pieces, and said second and third plate pieces are joined to each other through the resin film by the pressure-welding.

9. A method of manufacturing a solid electrolytic capacitor, said solid electrolytic capacitor including: (i) a capacitor element containing a porous sintered compact made of a valve metal and having an anode lead, and wherein a dielectric, an electrolyte layer and a cathode layer are successively formed on a surface of the porous sintered compact; (ii) an anode terminal connected to the anode lead of the capacitor element; (iii) a cathode terminal which is connected to the cathode layer; and (iv) a casing material covering the terminals and the capacitor element, said method comprising:
   preparing as the anode terminal a series of members in which a first plate piece is continuous to a third plate piece through a second plate piece;
   fabricating a T shape from the series of members by punching the series of members based on a press work and a bending work, such that the first and third plate pieces intersect in to form the T shapes, the first plate piece extends to said anode lead, and the T shape does not include a connection part for connecting the first and third pieces; and
   bending and crushing said second and third plate pieces to fold said second and third plate pieces onto each other such that one surface of the third plate piece is exposed to an exterior of the casing material as a mounting surface of the solid electrolytic capacitor.

10. The method of manufacturing a solid electrolytic capacitor as defined in claim 9, wherein the second plate piece is arranged nearer to said, cathode layer than said third plate piece.

11. The method of manufacturing a solid electrolytic capacitor as defined in claim 9, wherein said first plate, said second plate and said third plate of said anode terminal are formed of a single metal plate.

12. The method of manufacturing a solid electrolytic capacitor as defined in claim 9, wherein said cathode terminal includes a fourth plate piece and a fifth plate piece each having an inner end connected to an interconnection portion so as to form a step through the interconnection portions, such that the fourth plate piece and the fifth plate piece are parallel to each other, wherein one surface of the fourth plate piece is joined to said cathode layer, and a surface of the fifth plate piece which is farthest from said cathode layer forms a mounting surface exposed to the exterior of said casing material.

13. The method of manufacturing a solid electrolytic capacitor as defined in claim 12, wherein said fifth plate piece is formed so as to extend away from said anode terminal with respect to said fourth plate.

14. A method of manufacturing a solid electrolytic capacitor including: (i) a capacitor element containing a porous sintered compact made of a valve action metal and having an anode lead exposed to the exterior of one end thereof, and wherein a dielectric, an electrolyte layer and a cathode layer are successively formed on a surface of the porous sintered compact; (ii) an anode terminal connected to the anode lead of said capacitor element; a cathode terminal connected to the cathode layer; (iii) and a casing material covering said terminals and said capacitor element, said method comprising:

forming as said anode terminal:
 a first plate piece having a joint with said anode lead as a first end surface of the anode terminal and extending from the joint toward a mounting surface in a perpendicular direction with respect to the mounting surface;
 a second plate piece bent at substantially 90 degrees at the mounting surface so as to extend toward a cathode of the capacitor; and
 a third plate piece formed such that a side of said mounting surface is folded back toward an anode of the capacitor by bending at substantially 180 degrees;

extending said third plate piece to an end surface of said casing material toward the anode of the capacitor;

cutting perpendicularly at an end surface of said casing material so as to define a cut section that forms a second end surface of said anode terminal; and pressure-welding the second and third plate pieces to each other so as to become integral.

15. The method of manufacturing a solid electrolytic capacitor as defined in claim 14, wherein a resin film is formed on said second and third plate pieces, and said second and third plate pieces are joined to each other through the resin film by the pressure-welding.

16. The method of manufacturing a solid electrolytic capacitor as defined in to claim 9, wherein a resin film is formed on said second and third plate pieces, and said second and third plate pieces are joined to each other through the resin film by pressure-welding.

* * * * *